US012594979B2

(12) United States Patent
Longenecker et al.

(10) Patent No.: US 12,594,979 B2
(45) Date of Patent: Apr. 7, 2026

(54) FOLDING STROLLER ADAPTABLE FOR SINGLE OR DOUBLE OCCUPANTS

(71) Applicant: ARTSANA USA, INC., Lancaster, PA (US)

(72) Inventors: Michael L. Longenecker, Lancaster, PA (US); James M. Dillner, Leola, PA (US)

(73) Assignee: Artsana USA, Inc., Lancaster, PA (US)

( * ) Notice: Subject to any disclaimer, the term of this patent is extended or adjusted under 35 U.S.C. 154(b) by 394 days.

(21) Appl. No.: 17/903,519

(22) Filed: Sep. 6, 2022

(65) Prior Publication Data

US 2023/0078130 A1 Mar. 16, 2023

Related U.S. Application Data

(60) Provisional application No. 63/243,417, filed on Sep. 13, 2021.

(51) Int. Cl.
| | |
|---|---|
| *B62B 7/00* | (2006.01) |
| *B62B 7/06* | (2006.01) |
| *B62B 7/14* | (2006.01) |
| *B62B 9/10* | (2006.01) |
| *B62B 9/12* | (2006.01) |
| *B62B 9/28* | (2006.01) |

(52) U.S. Cl.
CPC ................ B62B 7/008 (2013.01); B62B 7/06 (2013.01); B62B 7/062 (2013.01); B62B 7/14 (2013.01); B62B 7/142 (2013.01); B62B 9/102 (2013.01); B62B 9/12 (2013.01); B62B 9/28 (2013.01)

(58) Field of Classification Search
CPC ........... B62B 7/008; B62B 7/14; B62B 7/142; B62B 7/145; B62B 9/28
See application file for complete search history.

(56) References Cited

U.S. PATENT DOCUMENTS

| | | | |
|---|---|---|---|
| 4,542,915 | A | 9/1985 | Wheeler, III et al. |
| 5,417,449 | A | 5/1995 | Shamie |
| 7,320,471 | B2 | 1/2008 | Maciejczyk |

(Continued)

FOREIGN PATENT DOCUMENTS

| | | | | | |
|---|---|---|---|---|---|
| CN | 109835405 A | * | 6/2019 | ............... | B62B 7/06 |
| CN | 112092888 A | | 12/2020 | | |

(Continued)

*Primary Examiner* — Emma K Frick
(74) *Attorney, Agent, or Firm* — Saxton & Stump, LLC

(57) ABSTRACT

A foldable stroller for transporting up to two child passengers in a tandem arrangement includes seating configurations that may be easily altered dependent upon the age/size of the passengers. The stroller frame includes an upper seat connector for selectively attaching an upper seat. A lower seat connector is positioned forward of and below the upper seat connector and includes a linkage that allows movement of an associated lower seat between opposing forward and rearward positions without altering the inclination of the lower seat. The forward connector position locates the associated lower seat sufficiently forward to provide clearance for the upper seat and its occupant. When the upper seat is removed, the linkage enables the associated seat to be shifted to the rearward position, shifting the center of gravity location rearward for improved stroller stability.

13 Claims, 13 Drawing Sheets

(56)  References Cited

U.S. PATENT DOCUMENTS

| | | | | |
|---|---|---|---|---|
| 7,490,844 | B2 * | 2/2009 | Barak .................... | B62K 13/00 |
| | | | | 280/7.17 |
| D593,459 | S * | 6/2009 | Liao ............................ | D12/129 |
| 7,614,640 | B2 * | 11/2009 | Dean ...................... | B62B 7/105 |
| | | | | 280/647 |
| 7,681,894 | B2 * | 3/2010 | Santamaria ............ | B62B 7/142 |
| | | | | 280/47.38 |
| 7,694,996 | B2 * | 4/2010 | Saville ................... | B62B 7/062 |
| | | | | 280/47.38 |
| 8,262,103 | B2 * | 9/2012 | Enserink ................ | B62B 7/126 |
| | | | | 280/47.38 |
| 8,328,208 | B2 | 12/2012 | Chen | |
| 8,857,829 | B2 | 10/2014 | Cheng et al. | |
| 8,882,134 | B2 * | 11/2014 | Rolicki .................... | B62B 9/02 |
| | | | | 280/647 |
| 9,108,659 | B2 | 8/2015 | Sparling | |
| 9,227,650 | B2 * | 1/2016 | Gillett ........................ | B62B 9/28 |
| 9,545,941 | B2 | 1/2017 | Pacella et al. | |
| 9,849,903 | B1 * | 12/2017 | Lai ........................... | B62B 7/008 |
| 10,144,442 | B2 | 12/2018 | Ransil | |
| 10,293,843 | B2 * | 5/2019 | Naslain ................... | B62B 9/104 |
| 10,435,058 | B2 | 10/2019 | Haut et al. | |
| 10,442,453 | B2 * | 10/2019 | Haut ........................ | B62B 7/062 |
| 10,449,987 | B2 | 10/2019 | Gibson | |
| 10,899,377 | B2 | 1/2021 | Eggert-Crowe et al. | |
| 11,208,136 | B2 * | 12/2021 | Taylor ..................... | B62B 9/104 |
| 11,338,836 | B2 * | 5/2022 | Perrot ..................... | B62B 7/008 |
| 11,505,231 | B1 * | 11/2022 | Zehfuss .................. | B62B 7/006 |
| 11,807,288 | B2 * | 11/2023 | Umehara ............... | B62K 13/08 |
| 12,377,900 | B2 * | 8/2025 | Eggert-Crowe ......... | B62B 9/26 |
| 2010/0072732 | A1 | 3/2010 | Offord | |
| 2012/0169021 | A1 | 7/2012 | SantaMaria | |
| 2022/0371643 | A1 * | 11/2022 | Hu ........................... | F16C 11/10 |
| 2022/0410959 | A1 * | 12/2022 | Flessa .................... | B62B 7/145 |
| 2025/0108850 | A1 * | 4/2025 | Walsh .................... | B62B 7/062 |

FOREIGN PATENT DOCUMENTS

| | | | | |
|---|---|---|---|---|
| CN | 212637605 | U | 3/2021 | |
| CN | 114104071 | A * | 3/2022 | |
| CN | 118182610 | A * | 6/2024 | ........... B62B 7/008 |
| CN | 108674478 | B * | 6/2025 | ............. B62B 7/12 |
| DE | 20313208 | U1 * | 10/2003 | ............. B62B 7/10 |
| DE | 102005029448 | A1 * | 1/2007 | ........... B62B 9/203 |
| DE | 202011052084 | U1 | 2/2012 | |
| EP | 0522783 | A2 * | 1/1993 | |
| EP | 2289762 | A2 | 3/2011 | |
| EP | 2371670 | A2 * | 10/2011 | ........... B62B 7/105 |
| GB | 191122873 | A | 5/1912 | |
| TW | 201604058 | A | 2/2016 | |
| WO | 2010116215 | A1 | 10/2010 | |
| WO | WO-2016130471 | A2 * | 8/2016 | ........... B62B 7/008 |

* cited by examiner

FOLDING STROLLER ADAPTABLE FOR SINGLE OR DOUBLE OCCUPANTS

CROSS REFERENCE TO RELATED APPLICATIONS

This application claims the benefit of priority to U.S. provisional patent application 63/243,417, filed Sep. 13, 2021.

BACKGROUND OF THE INVENTION

The present application relates generally to the field of child strollers. More particularly, the present invention relates to a foldable stroller that is conveniently reconfigurable to carry one or two child occupants.

Improving the ease with which stroller may be reconfigured between folded for stowage and deployed for use continues to encourage innovation. Additionally, stroller designs that are easily adapted to transport multiple child occupants are increasingly popular, especially if the designs are easily adaptable to accommodate occupants in a range of sizes, whether both occupants are similarly sized (e.g., twins) or of differing sizes (e.g., different aged siblings), also inspire innovation trends.

Tandem style strollers are particularly favored as their design is well-suited to use with both single and double occupants. Known designs are somewhat limited in their ability to be re-configured to meet the fit requirements of maturing child occupants. Often these designs are optimal only for similarly sized occupants. The designs may not be adaptable to accommodate the child occupants as they grow. Most design compromise stroller performance when the tandem frame is reconfigured for use as a single-occupant stroller.

There is a need for a foldable tandem stroller that is easily foldable, even when configured with tandem seating, and conveniently convertible between single and tandem seating configurations that overcomes the above limitations and concerns.

SUMMARY OF THE INVENTION

Accordingly, the present invention, in any of the embodiments described herein, may provide one or more of the following advantages:

According to one embodiment of the present invention, a stroller having a forwardly extending front wheel support frame with right and left side portions and at least one forwardly disposed wheel connector, a rearwardly extending rear wheel support frame with right and left side portions and rearwardly disposed wheel connectors, and an upwardly extending handle support frame with right and left side portions terminating in one or more handles at the upper end. The support frames are interconnected by right and left side fold mechanisms to form a collapsible frame. The folding mechanisms allow movement of the front wheel support frame, rear wheel support frame, and handle support frame as the stroller frame is moved between collapsed and deployed configurations and provides a latching mechanism to maintain the frame in at least the deployed position until selectively released. A folding link member connects the front and rear wheel support frames and coordinates folding movement of the wheel and handle support frames. The folding link member includes a transverse pivot intermediately disposed between the front and rear support connections. The pivot is configured to displace downwardly as the stroller frame is folded to improve folding space efficiency. Upper seat connectors are connected to the right and left side handle support portions, respectively, allowing a seating apparatus for a child to be selectively attached to the upper seat connectors. Lower seat connectors are connected to the right and left side front wheel support portions, respectively, and allow movement of a connected seating apparatus between generally opposing forward and rearward positions.

It is another object of the present invention to provide a foldable stroller for transporting up to two child passengers wherein seating configurations may be easily altered dependent upon the age/size of the passengers. The upper and lower seat connectors include receptacles to receive a standard connector which allows different seat designs to be attached. Connectors may be fitted to safety seats for occupancy by infants, folding seat frames for occupancy by older/larger children, combinations of one or both seat styles. The receptacles and seat connectors are configured to allow attachment of different seats in the proper orientations for stroller safety and to allow a common seat connector design to be used in either location. The frame further includes a standing platform connected to the rear wheel supports which allows a small child to stand in the space opened by removing the upper seat. A seating platform may also be provided to allow the child to sit rearward facing with feet resting on the standing platform.

In another aspect of the invention to provide a foldable tandem stroller that may be reconfigured to transport a single child occupant. Forward seat connectors are connected to the right and left side front wheel support portions by an articulated linkage that allows the seat connectors' position to be moved between generally opposing forward and rearward locations. The forward location positions the attached seat sufficiently forward to provide space for the rearward seat and its occupant. When the rearward seat is removed, moving the articulated linkage to locate the attached seat in the rearward position shifts the attached seat position and resultant center of gravity location rearward for improved stroller stability.

It is a still further object of the present invention to provide a foldable frame having a release handle operably connected to a latching mechanism wherein the latching mechanism is configured to bias movement of select frame members based on frame and release handle orientations that is durable in construction, inexpensive of manufacture, carefree of maintenance, easily assembled, and simple and effective to use.

These and other objects are achieved in accordance with the present invention by providing a foldable stroller for transporting up to two child passengers wherein seating configurations may be easily altered dependent upon the age/size of the passengers. The stroller frame includes a forwardly extending front wheel support frame with right and left side portions and at least one forwardly disposed wheel connector, a rearwardly extending rear wheel support frame with right and left side portions and rearwardly disposed wheel connectors, and an upwardly extending handle support frame with right and left side portions terminating in one or more handles at the upper end. The support frames are interconnected by right and left side fold mechanisms to form a collapsible frame. Upper seat connectors are connected to the right and left side handle supports, respectively, allowing a seating apparatus for a child to be selectively attached to the upper seat connectors. Lower seat connectors are connected to the right and left side front wheel supports, respectively, and allow movement of a connected seating apparatus between generally opposing forward and rearward positions. The forward position locates the attached seat sufficiently forward to provide space for the rearward seat and its occupant. When the rearward seat is removed, moving the articulated linkage to reposition the attached seat to the rearward position shifts the attached seat position and resultant center of gravity location rearward for improved stroller stability.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "up" or "down," "right" or "left," or "top" or "bottom" are used as a matter of mere convenience and are determined as the stroller would normally be pushed by a user across the floor or a similarly level surface while in an operating position. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

When referring to the figures, like parts are numbered the same in all of the figures. Inclusion of an "R" or an "L" designation in conjunction with a reference number signifies an item shown on the right or left side of the stroller, respectively. Use of the reference number sans "R" or an "L" designation refers to the item generically without regard to a particular orientation.

Figure 1:
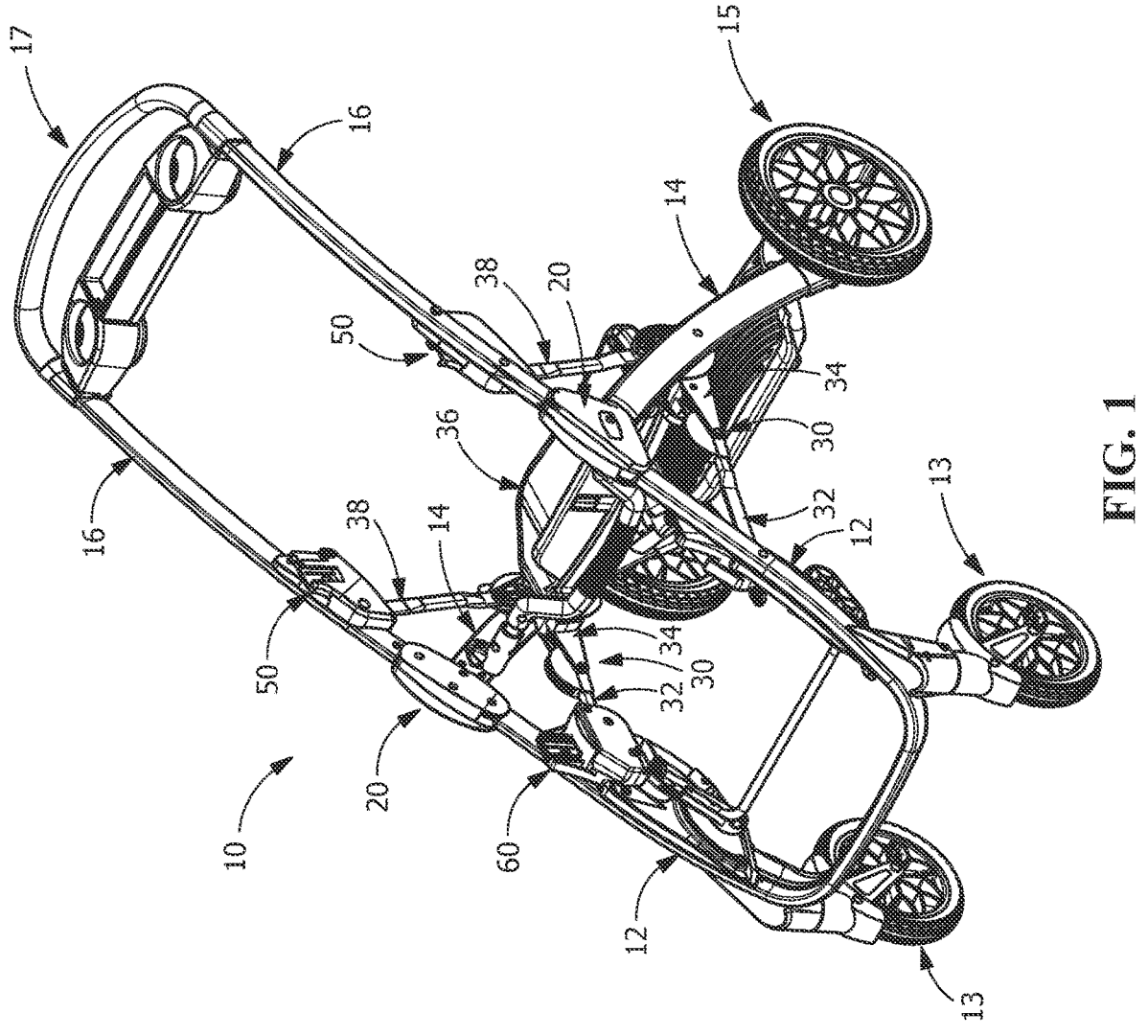
FIG. 1 is a perspective view of a folding stroller frame embodying aspects of the present invention.
Figure 3:
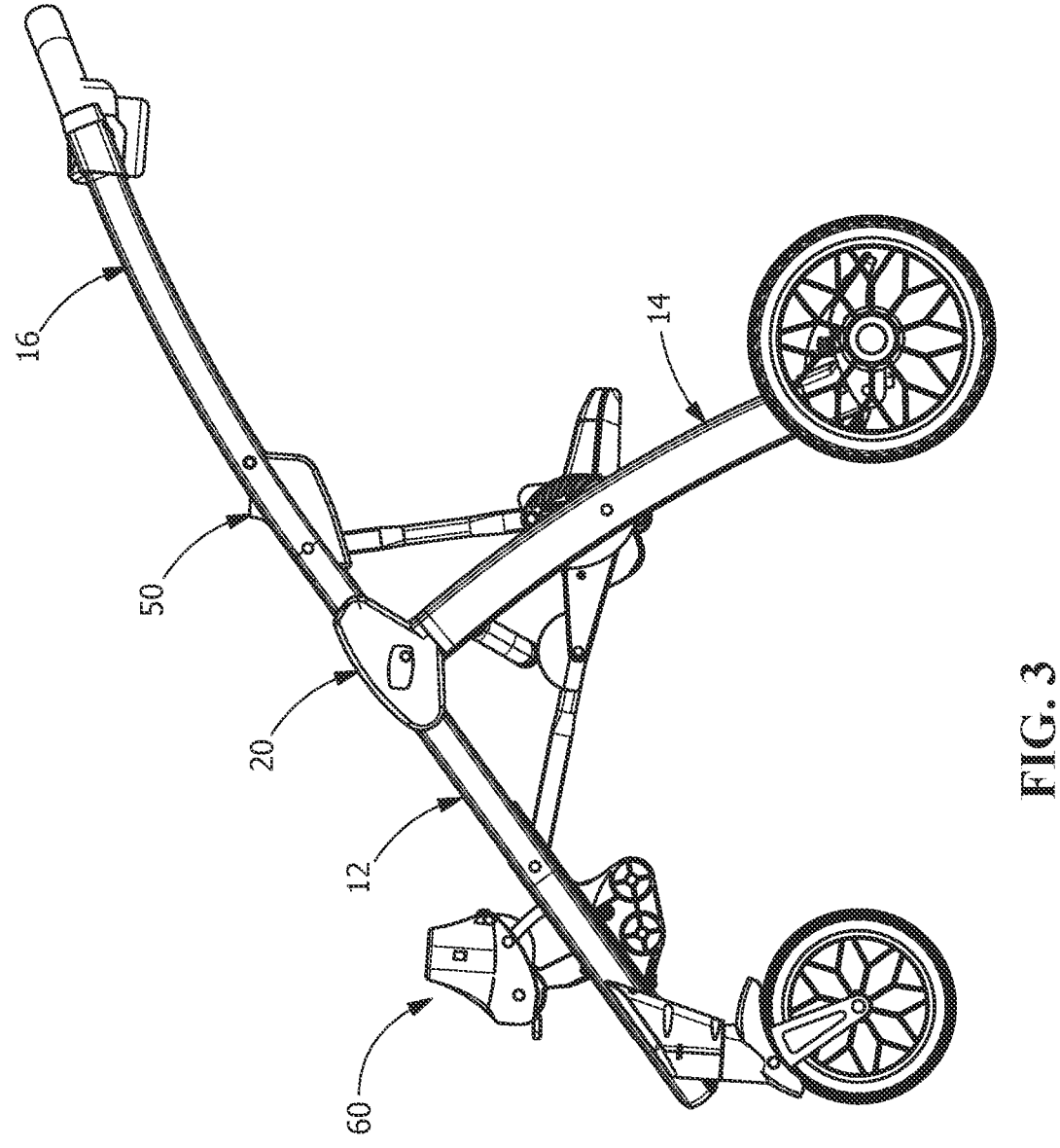
FIG. 3 is a side view of the folding stroller frame of FIG. 1 wherein the lower, forward seat connector is shown in a forward position.
Figure 4:
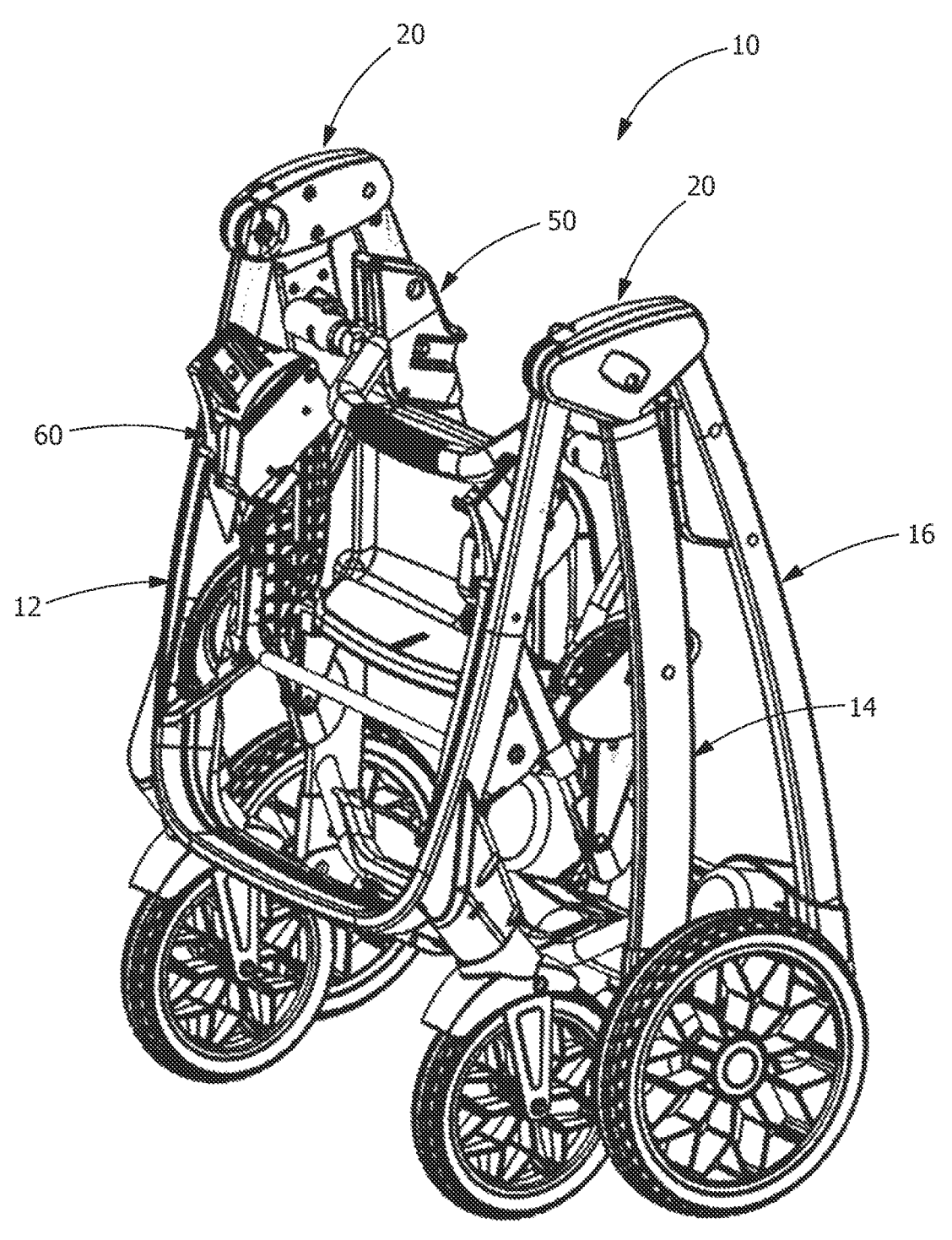
FIG. 4 is a perspective view of the folding stroller frame of FIG. 1 shown in a folded configuration.

Referring to FIGS. 1 through 15, a foldable stroller frame 10 is shown comprising a forwardly extending front wheel support frame 12 having right and left side front wheel support portions 12 with at least one forwardly disposed wheel 13, a rearwardly extending rear wheel support frame 14 having right and left side rear wheel support portions with rearwardly disposed wheels 15, and an upwardly extending handle support frame having right and left side handle support portions terminating in one or more handles 17 at the upper end. The support frames are interconnected by centrally positioned right and left side folding joints 20 to form the main portion of the collapsible stroller frame. The folding joints 20 enable pivoting movement of respective front wheel support frame 12, rear wheel support frame 14, and handle support frame 16 so that the stroller frame 10 may be moved between the collapsed configuration (see FIG. 4) and the deployed configuration position shown in FIGS. 1 through 3.

Frame 10 further includes a folding link frame 30 comprising right and left side forward link portions 32 and right and left side rearward link portions 34 connected at their proximal ends by pivot connectors 35 which enable pivoting movement between the forward and rearward link portions. The distal ends of the forward link portions 32 are pivotally connected to the respective side portions of the front wheel support frame 12. The distal ends of the rearward portions 34 are pivotally connected to respective side portions of the rear wheel support frame 14. The folding link frame 30 synchronizes movement of the right and left side wheel support portions as the frame 10 is moved between collapsed and deployed configurations. A seating platform 36 connected adjacent to the right and left side rearward link portions 34 and right and left side handle links 38 further coordinates folding motion of the respective frame members and also provides a surface for a child occupant to sit in certain stroller configurations.

An exemplar stroller frame upon which the present invention may be incorporated is disclosed in U.S. Pat. No. 10,144,442, to Ransil, the descriptive portions relating to stroller frame operation are incorporated herein by reference. The patent shares common ownership with the applicant of the instant disclosure.

Frame 10 is configurable to transport two child occupants in tandem (one behind the other), having an upper, rear seat location and a lower, front seat location. Right and left rear seat connector assemblies 50 are provided on respective right and left side handle support portions of the handle support frame 16 allowing a seating apparatus for a child to be selectively attached to the rear seat connector assemblies. The rear seat connector assemblies are preferably fixedly attached to the handle supports and do not allow movement or adjustment thereof on the handle supports.

Each rear seat connector assembly 50 includes a receptacle portion 52, preferably connected to the handle support, and a tab portion 54, preferably provided on the seat or frame to be attached to the stroller frame. Alternatively, an adapter frame 70 (see FIGS. 14 and 15) may be provided to enable connection of seats or frames whose design did not originally include a tab portion 54 compatible with the receptacle portion 52. The receptacle portions 52 are generally C- or channel-shaped in cross section, with the open portion of the channel oriented laterally inward. The tab portions 54 are configured to slidingly engage the channel shaped receptacle portion 52 from one end and limit relative movement to sliding insertion/removal along an engagement axis (see FIGS. 12 and 13). The channel-shaped receptacle portion 52 may be asymmetrically configured about the insertion axis to orient the tab portion with the receptacle portion in a specific, predetermined orientation.

Figure 2:
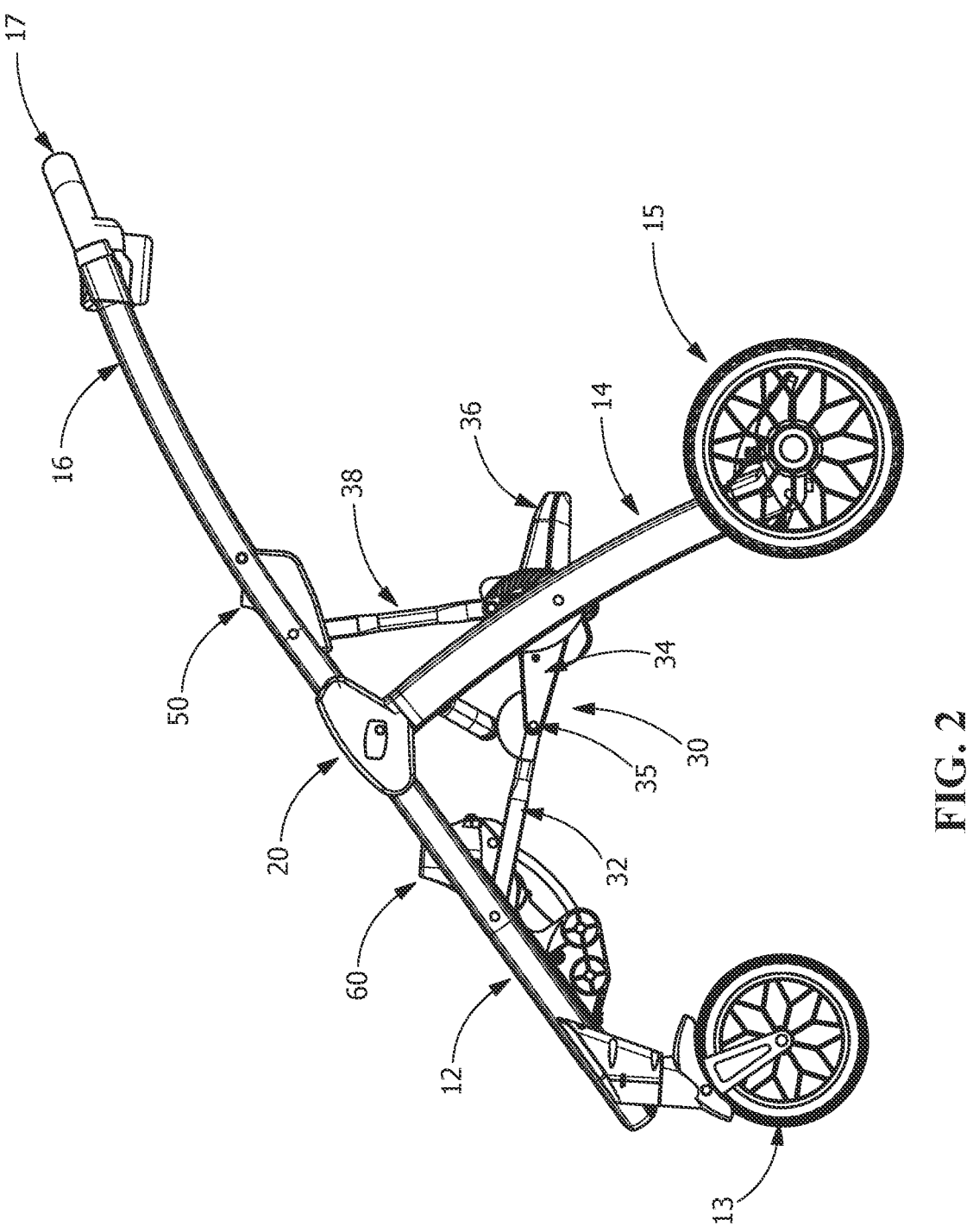
FIG. 2 is a side view of the folding stroller frame of FIG. 1 wherein the lower, forward seat connector is shown in a rearward position.
Figure 11:
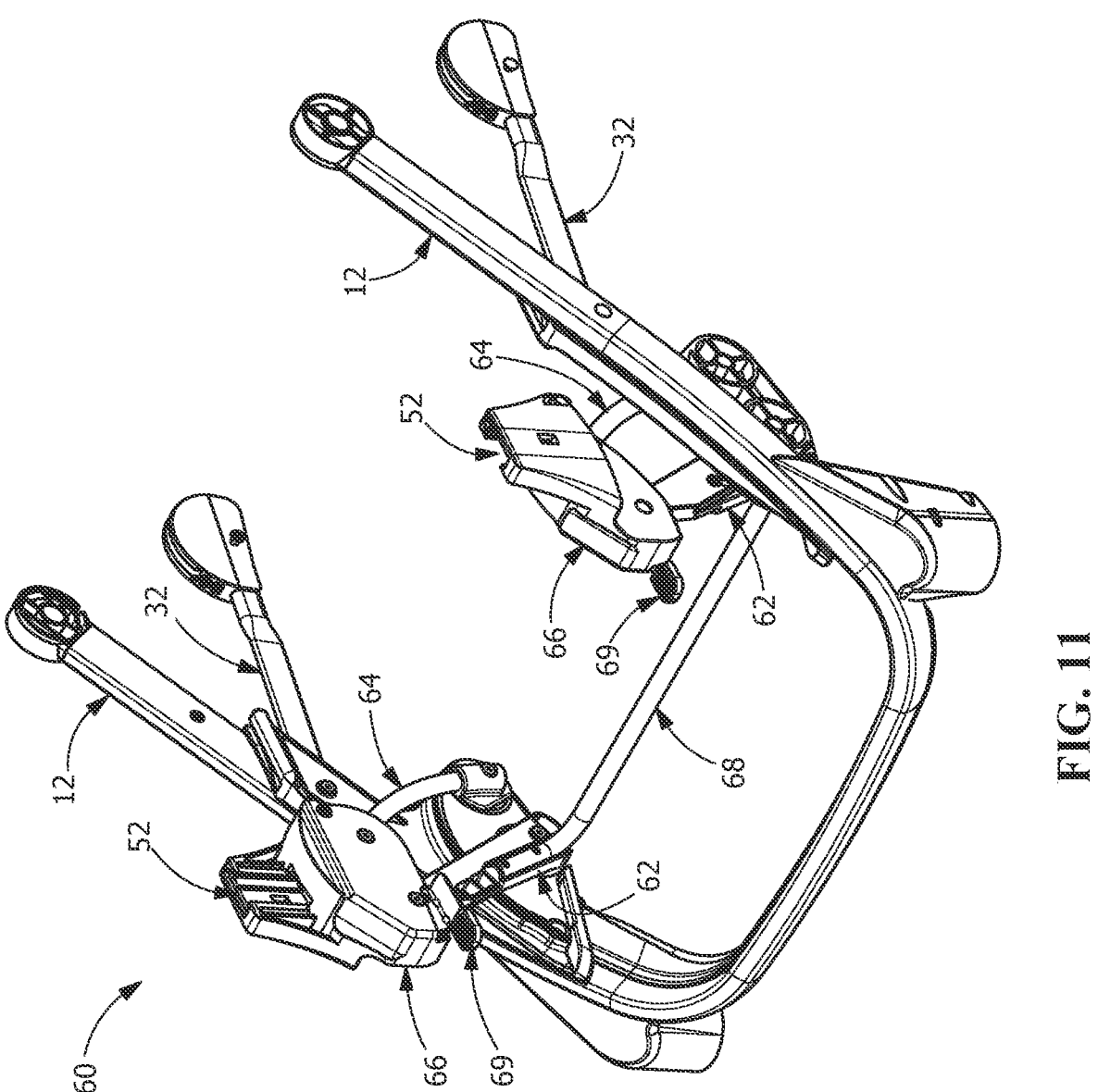
FIG. 11 is a partial perspective view of the articulated linkage used in the lower-forward seat connector.

Frame 10 also includes a front seat connector assembly 60 connected to the right and left side front wheel supports forward of the rear seat connector assemblies 50. As best illustrated in FIG. 11, the front seat connector assemblies 60 include a linkage comprising a first link 62 and a second link 64 connected to a moveable connector carrier 66. The receptacle portion 52 of the front connector assembly is attached to the connector carrier 66 to the frame and enabling the receptacle portion 52 of the connector assemblies to be moved between generally opposing forward (FIG. 3) and rearward positions (FIG. 2). The linkage may be a parallelogram linkage that enables movement between the forward and rearward positions while maintaining the attitude (tilt) of the front seat connector assembly and attached seat substantially unchanged seat as it moves. A cross-connection frame member 68 may be provided to operably link the respective right and left side portions of the front connector assemblies so that the link members move in unison. Lateral synchronization of the linkage movement may also be provided by a front seat connected to the front seat connector assembly. A latching mechanism selectively releasable by latch releases 69 may be provided to secure the front connector assembly is either the forward or the rearward position to preclude unintentional seat movement while the stroller is in use. The latching mechanism preferably engages one or more link pivot points in the parallel linkage to inhibit pivoting and thus inhibit movement of the linkage.

The articulating linkage of the front seat connector provides two operable configurations for the front seat position. The linkage and front connector assembly further allows movement of the connector assembly and attached seat between the positions without requiring the seat to be detached during the movement (though such movement should not be performed while the front seat is occupied).

Positioning the front seat connector assembly 60 in the forward position shifts the position of the attached seat sufficiently forward to provide clearance for the rear-mounted seat, rear-mounted infant carrier frame, or for an older child occupant standing in the rear position on standing platform 37 or seated on seating platform 36, best illustrated in FIGS. 5 through 9.

Figure 5:
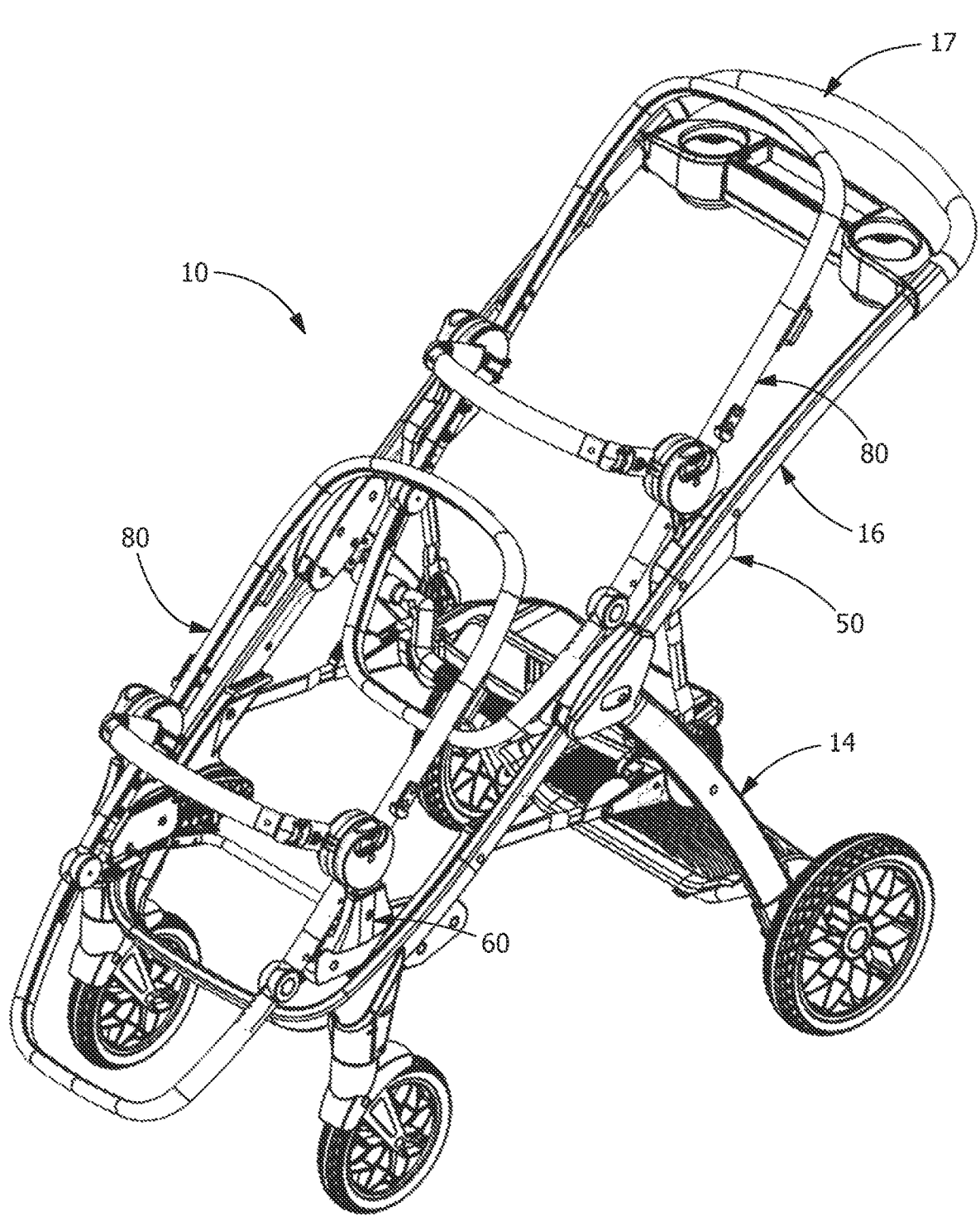
FIG. 5 is a perspective view of the stroller frame of FIG. 1 shown with a pair of forward-facing seat frames connected thereto.
Figure 6:
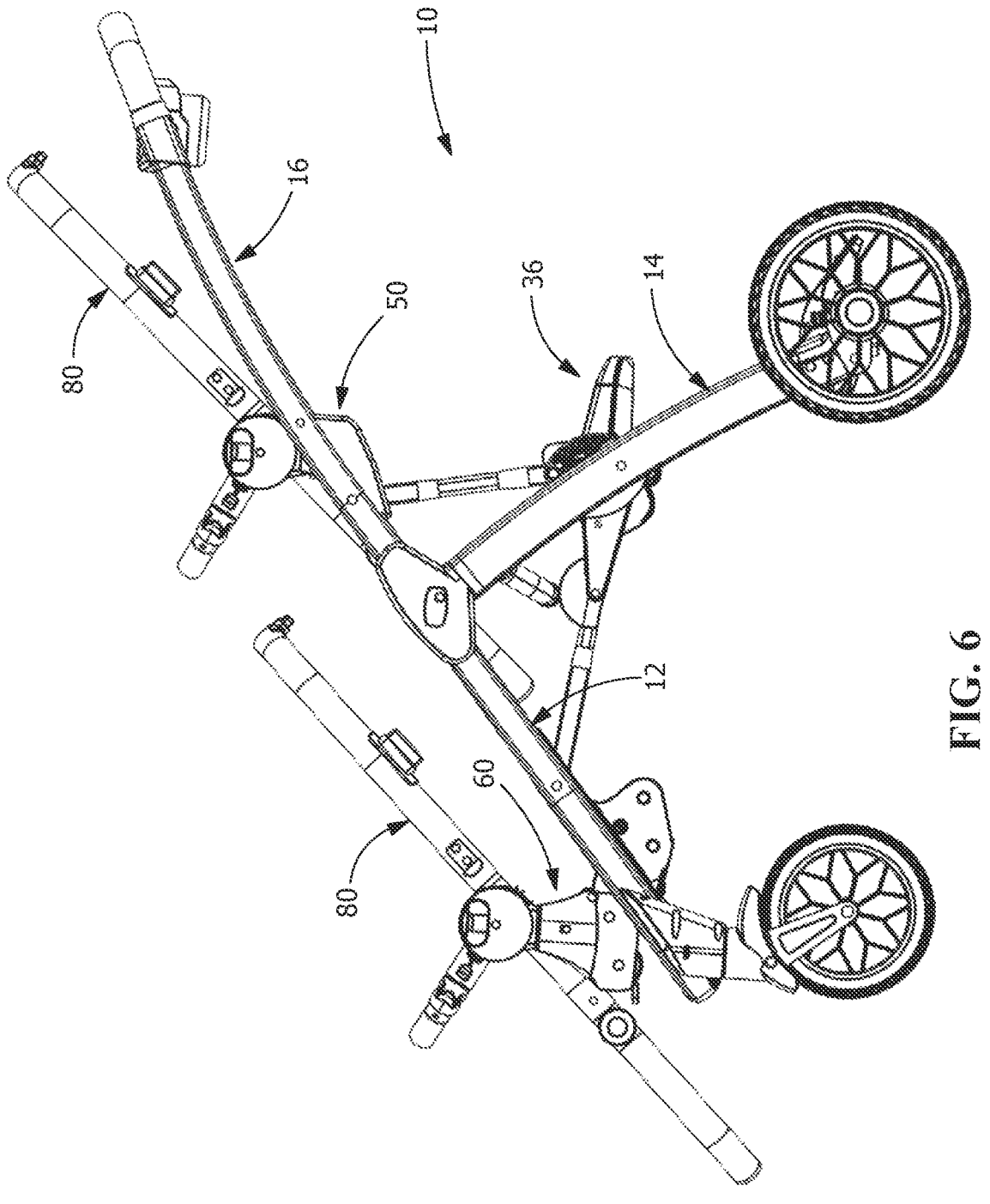
FIG. 6. Is a side elevation view of the stroller frame and connected seat frames of FIG. 5.
Figure 7:
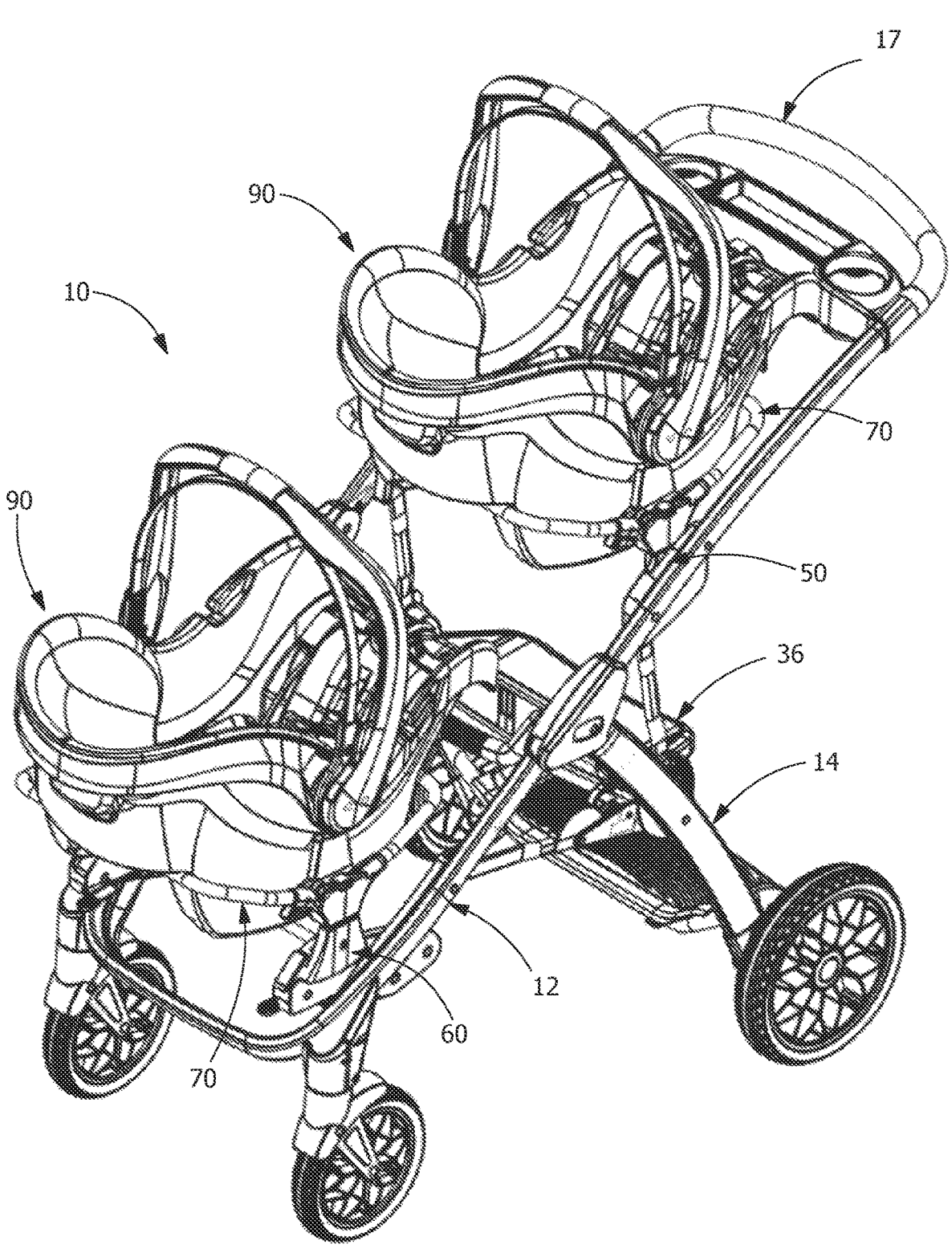
FIG. 7 is a perspective view of the stroller frame of FIG. 1 shown with a pair of rearward-facing infant seats connected thereto.
Figure 8:
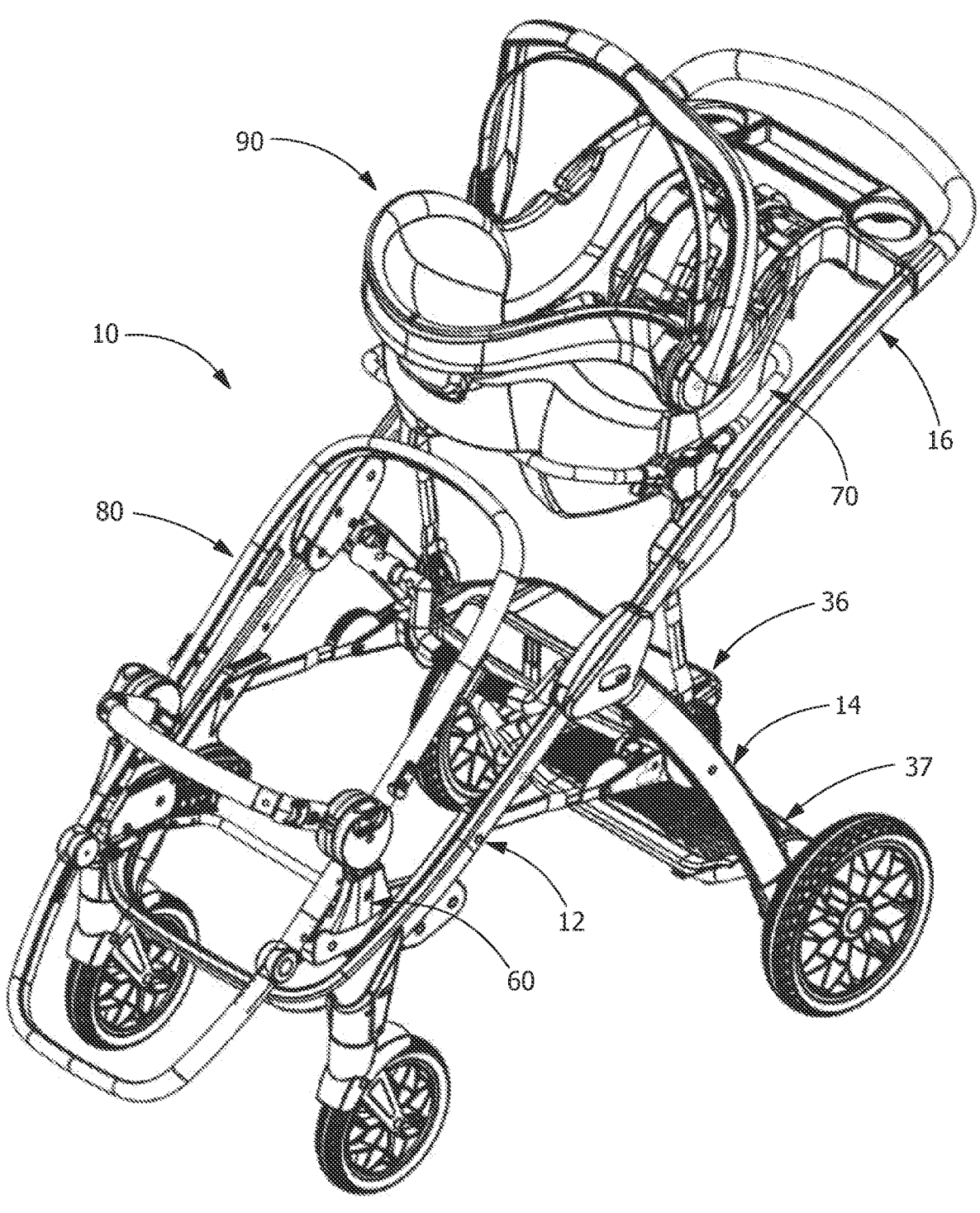
FIG. 8 is a perspective view of the stroller frame of FIG. 1 shown with a forward-facing seat frame connected in the forward location and an infant seat connected in the rearward location.

In FIGS. 5 and 6, the stroller frame 10 is shown with a pair of seat frames 80, one mounted in the front and the other mounted in the rear position. The seat frames 80 are shown in forward-facing orientation (the child occupant faces forward). The rear position seat frame 80 may be re-oriented for rear-facing use is desired; the front seat frame must remain front-facing for stability. In FIG. 7, the seat frames 80 are replaced by adapter frames 70 supporting a pair of infant seats 90. The adapter frames 70 are configured to limit infant seat to rear-facing orientations only. FIG. 8 illustrates the flexibility of the stroller wherein a seat frame 80 is attached in the front position and an infant seat 90 is attached in the rear position.

Figure 9:
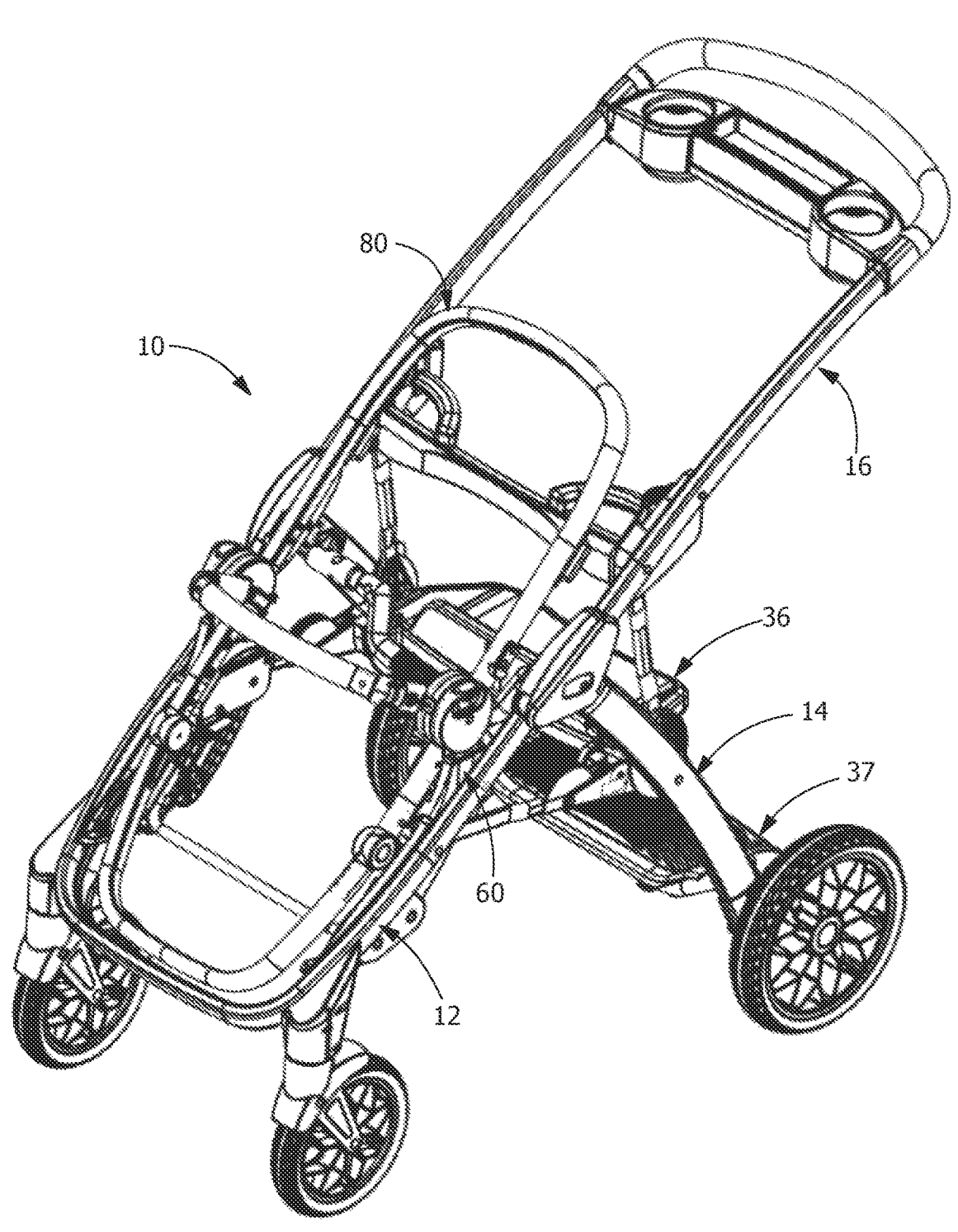
FIG. 9 is a perspective view of the stroller frame of FIG. 1 shown with a forward-facing seat frame connected in the forward location and the rear location available for a second occupant.
Figure 10:
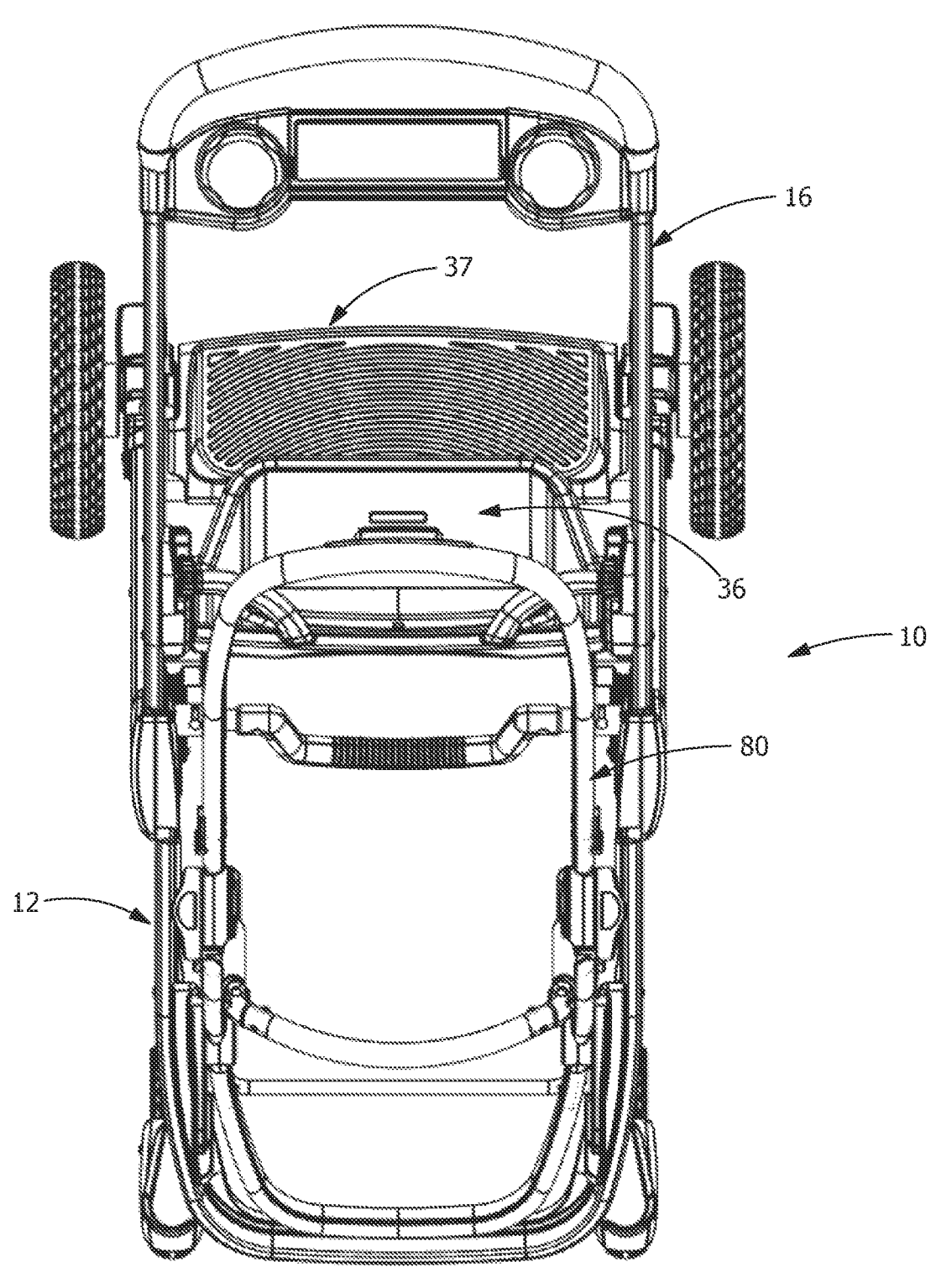
FIG. 10 is a plan view of the stroller frame as configured in FIG. 9.

Shifting the front seat connector assembly to the rearward position shifts the position of the attached seat rearwardly, behind the front axle centerline which improves stability of the stroller when it is being used to transport a single child occupant, shown in FIGS. 9 and 10. This configuration may also allow a second child passenger to stand behind the front-mounted seat frame 80 on a standing platform 37 spanning between the rear wheel supports adjacent to the rear wheel axle line. The standing platform 37 may also be used in conjunction with the seating platform 36.

The rearward position of the front seat connector also allows the stroller frame 10 to be more compactly folded when it is not in use (FIG. 4) by locating the front connector assembly and linkage adjacent to the front wheel supports 12.

Figures 12, 13:
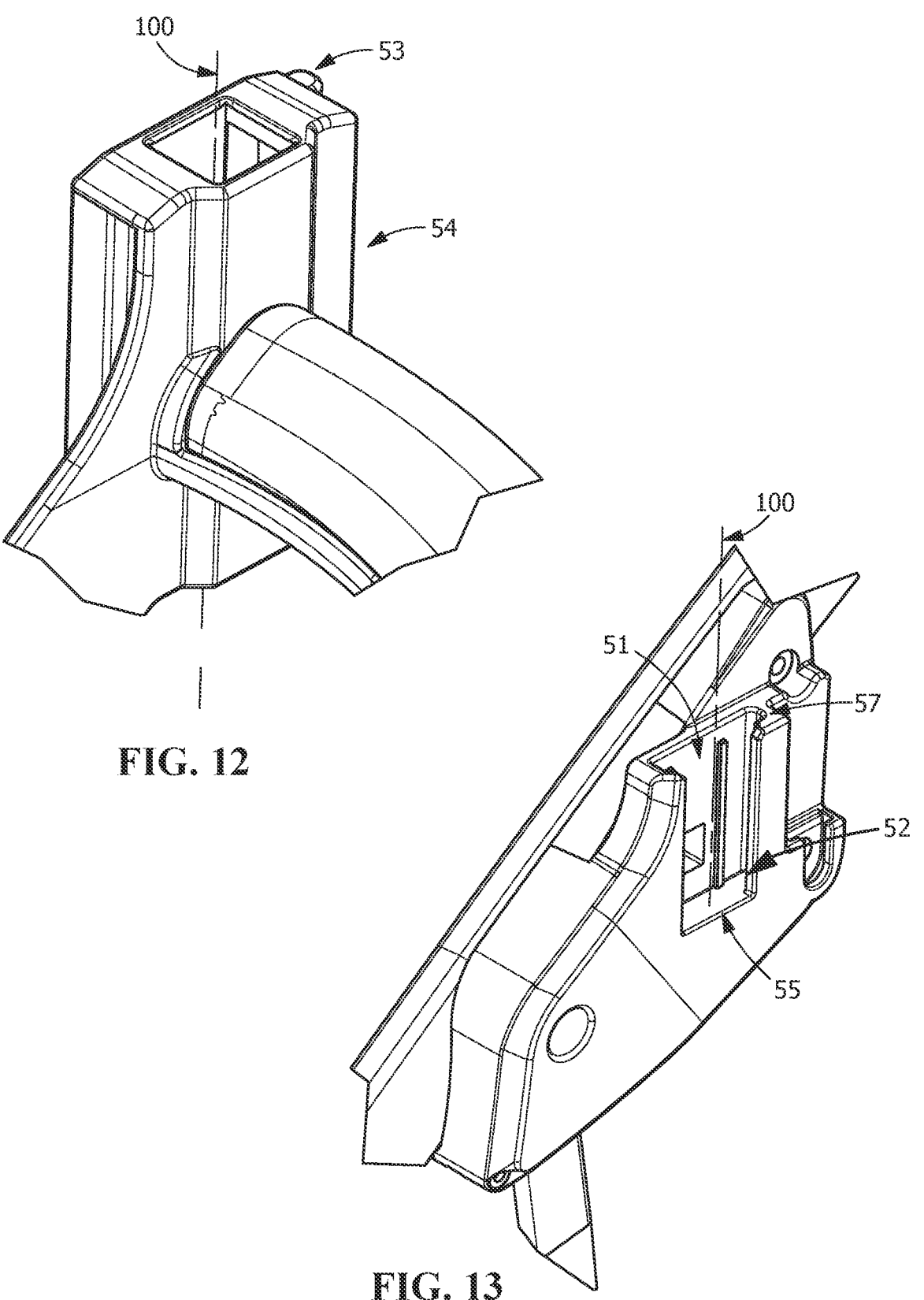
FIGS. 12 and 13 provide details on the connector tab and receptacle.
Figures 14, 15:
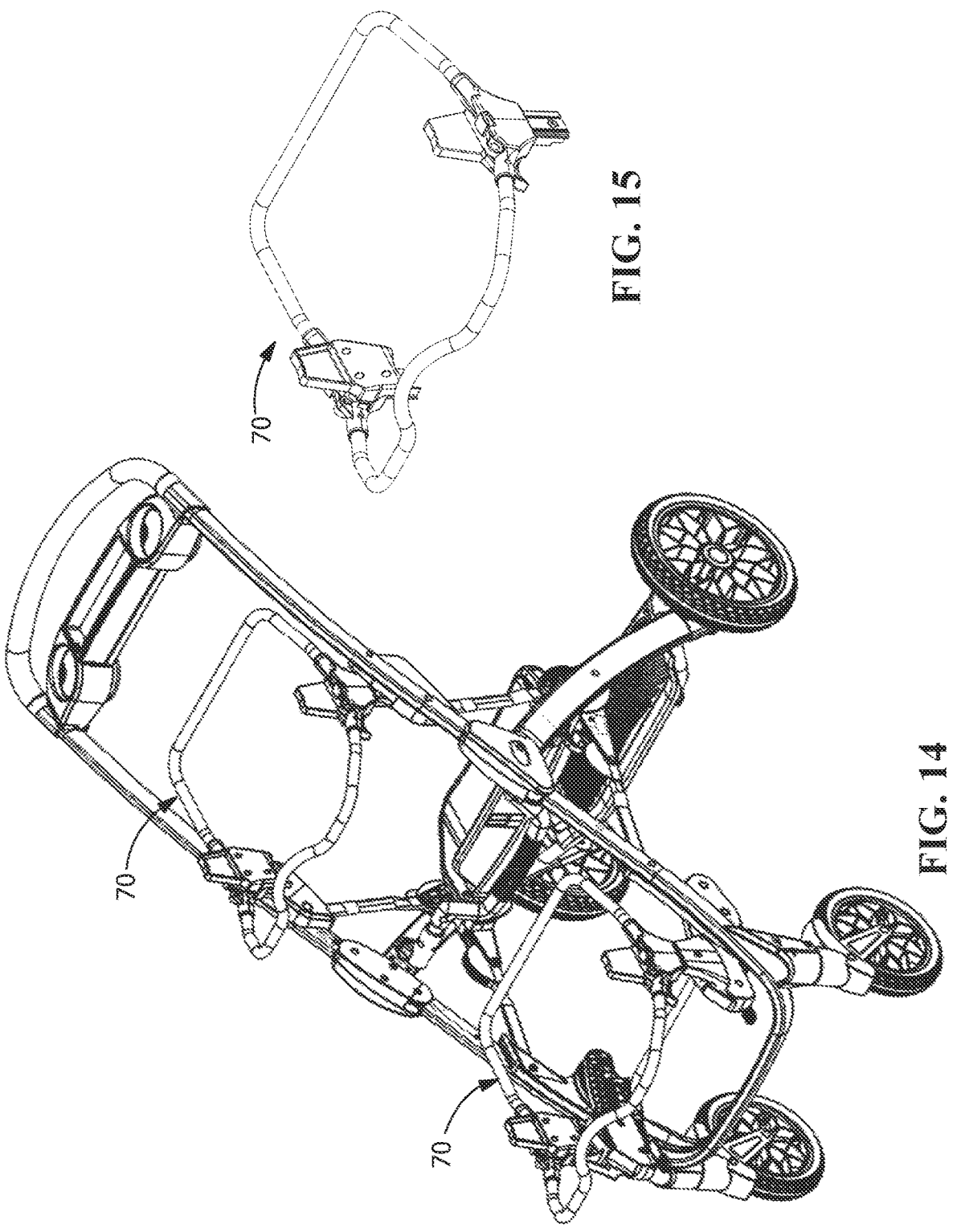
FIGS. 14 and 15 provide details on an auxiliary frame for attaching seats that do not incorporate the specific connector of the invention, such as infant car seats.

FIGS. 12 and 13 illustrate the asymmetric design of the connector assemblies 50, 60. Though illustrated on rear seat connector assemblies 50, the features may be employed on the front seat connector assemblies 60 as well. The connector assemblies comprise a tab portion 54 compatible with the receptacle portion 52. The receptacle portions 52 are generally channel-shaped in cross section, with the open portion 55 of the channel oriented laterally inward. The tab portions 54 are configured to slidingly engage the channel shaped receptacle portion 52 from an open end 51 and limit relative movement to sliding insertion/removal along an engagement axis 100. The channel-shaped receptacle portion 52 may be asymmetrically configured about the insertion axis to orient the tab portion with the receptacle portion. In one embodiment, the tab portion includes a flange 53 that engages a relief 57 in the receptacle portion 52 to limit the relative orientation between tab and receptacle. The asymmetry keys the seat or adapter frames to the stroller frame to limit the configurations in which seats may be installed. The connector receptacle configuration may differ between front seat connector assemblies 60 and rear seat connector assemblies 50 to impose differing seat orientation limitations between the front and rear locations. It is preferred to limit any seat frame located in the front position to forward-facing. It is further preferred to limit infant seats to rear-facing orientations, accomplished by the orientation of the tab portions 54 provided on the adapter frames 70.

The connector assemblies are further provided with a means to positively latch the tab into the receptacle to prevent inadvertent release of the attached seats from the stroller frame. In one embodiment, a resilient retainer structure may be provided on the tab or connector portion which engages a receiver structure on the opposite portion when the tab portion is operably engaged in the receptacle portion. Disengagement of the tab portion requires disengagement of the resilient retainer structure from the receiver structure, typically by pressing against a portion of the retainer structure to overcome the resilient bias and move the retainer structure from engagement with the receiver structure.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention;

however, concepts, as based upon the description, may be employed in other embodiments without departing from the scope of the invention.

Having thus described the invention, what is claimed is:

1. A stroller comprising:
a front wheel support frame having first and second side portions spaced apart from each other, the front wheel support frame having a front wheel;
a handle support frame having first and second side portions spaced apart from each other;
a rear wheel support frame having first and second side portions spaced apart from each other;
first and second folding mechanisms connecting respective first and second side portions of the front wheel support, the rear wheel support, and the handle support, the folding mechanisms configured to enable pivoting movement of the front wheel support frame and the handle support frame about a generally transverse axis between folded and unfolded configurations;
a pair of rear seat connectors adapted to support an associated rear seat in selective attachment therewith in one of a forward-facing or a rearward-facing orientation, each of the rear seat connectors being attached to the handle support frame in a fixed position; and
a pair of front seat connectors adapted to support an associated front seat in selective attachment therewith in one of a forward-facing or a rearward-facing orientation, each of the front seat connectors attached to the front wheel support by a linkage configured to selectively move the associated front seat forwardly or rearwardly in relation to the front wheel without rotating the associated front seat;
wherein the front seat connectors and rear seat connectors each comprise a tab portion configured to be slidingly received into a receptacle portion, the tab portion and receptacle portions each having an asymmetric configuration that limits receiving of the tab portion into the receptacle portion to a single orientation.

2. The stroller of claim 1, wherein the linkage is a parallelogram linkage.

3. The stroller of claim 2, wherein the rear seat connectors are positioned rearward and above the front seat connectors when the stroller is unfolded.

4. The stroller of claim 1, wherein each of the pair of front seat connectors is connected to front wheel support frame by a parallelogram linkage, and the respective parallelogram linkages are linked for simultaneous forward or rearward movement.

5. The stroller of claim 1, wherein the asymmetric configuration of the tab portion and the receptacle portion differs between the front seat connectors and the rear seat connectors.

6. The stroller of claim 1, wherein the pair of front seat connectors may be moved forwardly or rearwardly while the associated front seat is attached thereto.

7. The stroller of claim 1, wherein the linkage includes a selectively releasable latch mechanism to restrain the seat connector in either the forward or rearward position.

8. The stroller of claim 1, wherein the associated front seat and the associated rear seat are individually selected from a group comprising an infant seat and a seat frame for supporting a child.

9. A stroller comprising:
a front wheel support frame having first and second side portions spaced apart from each other, the front wheel support frame having a front wheel;

a handle support frame having first and second side portions spaced apart from each other;
a rear wheel support frame having first and second side portions spaced apart from each other;
first and second folding mechanisms connecting respective first and second side portions of the front wheel support, the rear wheel support, and the handle support, the folding mechanisms configured to enable pivoting movement of the front wheel support frame and the handle support frame about a generally transverse axis between folded and unfolded configurations;
a pair of rear seat connectors adapted to support an associated rear seat in selective attachment therewith in one of a forward-facing or a rearward-facing orientation, each of the rear seat connectors being attached to the handle support frame in a fixed position;
a pair of front seat connectors adapted to support an associated front seat in selective attachment therewith in one of a forward-facing or a rearward-facing orientation, each of the front seat connectors attached to the front wheel support by a linkage configured to selectively move the associated front seat forwardly or rearwardly in relation to the front wheel without rotating the associated front seat; and
a child support structure connected to the rear wheel support frame configured to support a child positioned behind the associated front seat when no rear seat is attached.

10. A stroller selectively configurable for a single occupant or for two occupants in a tandem configuration, the stroller comprising:
a front wheel support frame having a front wheel;
a handle support frame;
a rear seat connector adapted to support an associated rear seat in selective attachment therewith in one of a forward-facing or a rearward-facing orientation, the rear seat connector fixedly attached to the handle support frame; and
a front seat connector adapted to support an associated front seat in selective attachment therewith in one of a forward-facing or a rearward-facing orientation, the front seat connector attached to the front wheel support by a parallelogram linkage configured to selectively displace the associated front seat forwardly or rearwardly in relation to the front wheel without rotating the associated front seat;
wherein the front wheel support frame and the handle support frame are configured to pivot about a generally transverse axis enabling the stroller to be collapsed to a folded configuration; and
wherein the front and rear seat connectors each include a first connector portion and a second connector portion configured to engage the first connector portion in a pre-determined orientation.

11. The stroller of claim 10, wherein the first and second front seat connector portions are configured to support the associated front seat only in a single orientation.

12. The stroller of claim 10, wherein the first and second rear seat connector portions are configured to support the associated rear seat in a forward-facing or a rearward-facing orientation.

13. The stroller of claim 10, further comprising a rear wheel support frame and a folding mechanism, the folding mechanism connecting the front wheel support frame, the rear wheel support frame, and the handle support frame and configured to enable movement of the support frame between the folded configuration and an unfolded configuration.

* * * * *